L. J. BERG.
CAR TRUCK.
APPLICATION FILED OCT. 26, 1912.
1,220,170.
Patented Mar. 27, 1917.
2 SHEETS—SHEET 1.
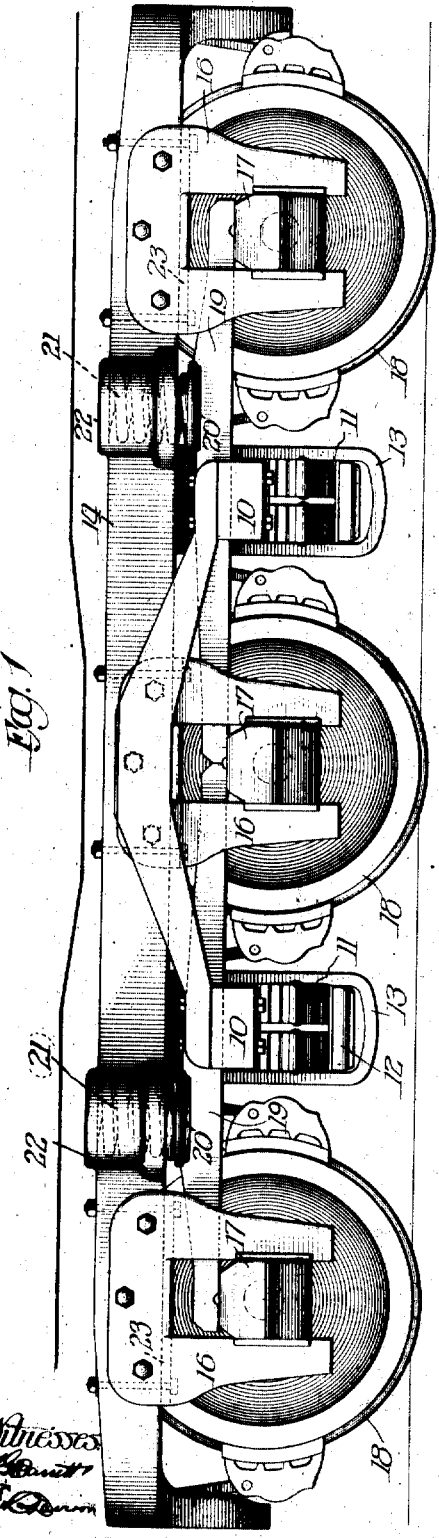
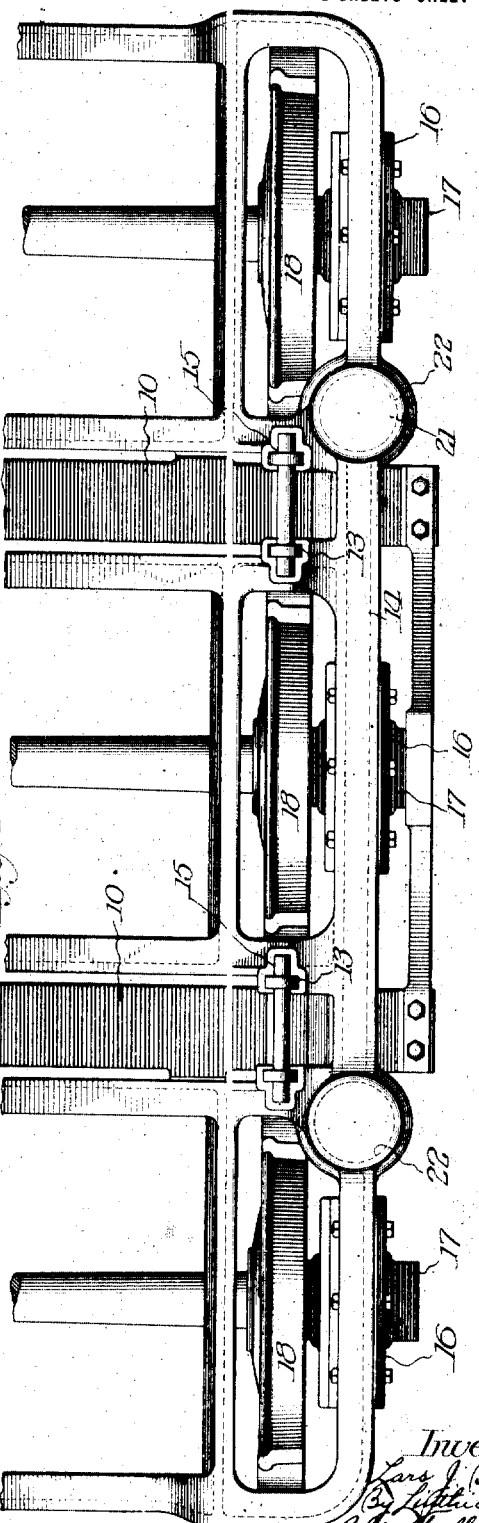

L. J. BERG.
CAR TRUCK.
APPLICATION FILED OCT. 26, 1912.
1,220,170.
Patented Mar. 27, 1917.
2 SHEETS—SHEET 2.
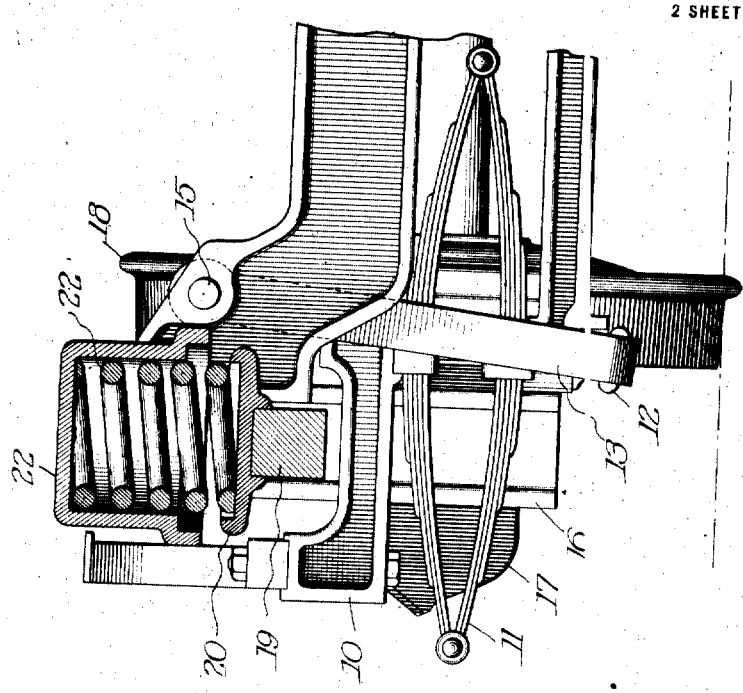
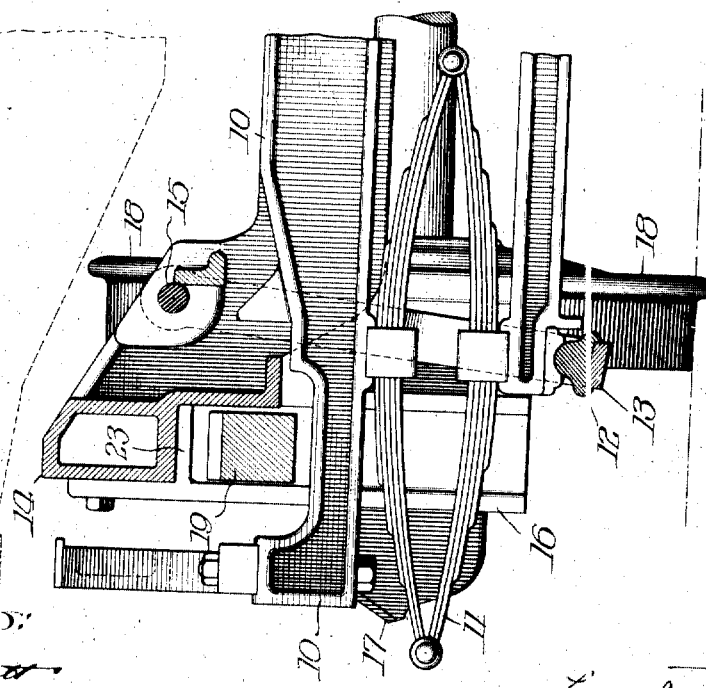

UNITED STATES PATENT OFFICE.

LARS J. BERG, OF CHICAGO, ILLINOIS.

CAR-TRUCK.

1,220,170.

Specification of Letters Patent. Patented Mar. 27, 1917.

Application filed October 26, 1912. Serial No. 727,844.

*To all whom it may concern:*

Be it known that I, LARS J. BERG, a citizen of the United States, residing at Chicago, in the county of Cook and State of Illinois, have invented certain new and useful Improvements in Car-Trucks, of which the following is a specification.

Heretofore, in four-wheel and six-wheel car-trucks, it has been customary to make the equalizer bars resting on the journal-boxes of a form having a depressed central-portion, which style of bar has been necessary to provide sufficient space for the accommodation and reception of the equalizer-bar springs interposed between the lower portions of the equalizer-bars and the truck-frame.

In six-wheel trucks of the Pullman type it has heretofore been impossible, or at least, inconvenient, to use two brake-shoes for each wheel, particularly for the center wheels, because the various parts of the truck structure, more especially the equalizer bars, prevented a ready replacement of worn shoes.

One of the leading features of this invention therefore, resides in the construction of the six-wheel truck to permit the use of twelve brake-shoes, two for each wheel and to so arrange and combine the structural elements that all of such shoes may be readily taken out and replaced. Another object of the invention is to decrease the cost of making the forged equalizer-bars and to provide convenient pockets or recesses in the truck-frame for the reception of the equalizer-bar springs.

In other words, in my improved construction I do away with the depressed central portions of the ordinary equalizer-bars and in their place employ substantially straight bars, and to compensate for this change without materially varying the position of the truck-frame, I make pockets in the frame itself to receive the now more elevated equalizer-bar springs.

In order that those skilled in this art may have a full and complete understanding of the features of construction of a structure embodying this invention, I have illustrated in the accompanying drawings forming a part of this specification, a preferred embodiment of the same.

In these drawings:

Figure 1 is a side elevation of a six-wheel car-truck incorporating my invention;

Fig. 2 is a fragmentary plan view of a portion of the truck shown in Fig. 1;

Fig. 3 is an enlarged cross-section through the truck adjacent to one of the bolster springs, and Fig. 4 is a cross-section through a part of the truck through one of the equalizer-bar springs.

As is customary in constructions of this general character, the truck is equipped with a pair of truck bolsters 10, 10 which support the load of the car-body in the usual manner, each of these bolsters at its opposite ends being supported on leaf bolster springs 11, 11, interposed between the truck bolsters 10 and the spring planks 12 carried in swing hangers 13, 13, supported by and pivotally hung on the truck-frame 14 at 15, 15. This truck-frame, as is clearly illustrated, is supplied with the usual pedestals 16, 16, coöperating with the journal-boxes 17, 17, provided for the axles equipped with the car-wheels 18, 18. Resting on the tops of these journal-boxes at each side of the truck I employ the two substantially straight equalizer-bars 19, 19 which, if desired, may be made of greater depth directly beneath the equalizer-bar springs hereinafter referred to, then at their ends bearing on the journal boxes. Each of these bars is equipped with a spring seat 20 receiving the bottom end of an equalizer-bar spring 21, each of such springs being accommodated largely in a pocket or recess 22 constituting a hollow integral enlargement or vertically offset portion of the cast metal truck-frame 14, the top of each of such pockets being closed, as is clearly shown while the bottom is open.

By thus straightening or elevating the equalizer-bars 19, in other words, doing away with the depressed middle parts of the same and at the same time using the cushion-springs 21 between the equalizer-bars and the truck-frame as is usual, I am enabled to so expose the wheels that I can employ two brake-shoes for each wheel and thereby gain the advantage of more braking power and equalizing the wear on the brasses of the journal-boxes, and at the same time have such brake-shoes in such position as to be readily replaced when worn out or damaged. The relative location of these parts is clearly shown in Fig. 1. The use of these bars or brake-shoes for the various wheels, and their operating mechanism, forms a part of a separate patent application.

A car truck constructed according to my invention possesses the further advantage that the equalizer-bar 19 lies above instead of below the truck bolsters 10, and in case of breakage of the bar the bolster serves to support the same temporarily pending repairs or replacement. Moreover the raising of the location of the equalizer springs 21 and their point of application to the equalizer bar due to the straightening of the latter, gives more clearance between the end of the equalizer bar and the journal box on the one hand and the truck frame 14 on the other, whereby the necessity of cutting away the truck frame and the pedestal in its upper medial position to accommodate the journal box under load is avoided and it is rendered possible to continue the flange 23 of the pedestal entirely across the top of the same beneath the truck frame 14, thus greatly increasing the strength of the structure.

While I have in this application shown a single embodiment only of this invention, it will be apparent to those skilled in the art that the same is susceptible of a variety of embodiments without departure from the substance of the invention and without the sacrifice of any of its substantial benefits and advantages.

I claim:

1. In a railway car-truck, the combination of journal boxes, a straight equilizer-bar bearing on said journal boxes, a truck-frame having a wheel-piece, and a spring interposed between said straight equalizer-bar and said wheel-piece, whereby to render accessible for repairs and renewal brake shoes disposed between the wheels in the space spanned by the equalizer bar, substantially as described.

2. In a six-wheel car-truck, the combination of journal boxes, an equalizer-bar bearing on said boxes, a truck-frame having a recessed wheel-piece, and a spring disposed between said equalizer-bar and truck-frame and accommodated in part at least in the recess of the wheel-piece, whereby to render accessible for repairs and renewal brake shoes disposed between the wheels in the space spanned by the equalizer bar, substantially as described.

3. In a railway car-truck, the combination of journal boxes, a substantially straight equalizer-bar bearing on said journal boxes, a recessed truck-frame, and a spring interposed between said substantially straight equalizer-bar and said truck-frame, said spring being accommodated in part at least in the recess of said frame, substantially as described.

4. In a six-wheel railway car-truck, the combination of journal boxes, substantially straight equalizer-bars bearing on said journal boxes, a truck-frame having recessed wheel-pieces, and springs interposed between said equalizer-bars and wheel-pieces, said springs being accommodated in part at least in the recesses of said wheel pieces, substantially as described.

5. In a six-wheel railway car-truck, the combination of journal boxes, a pair of truck-bolsters, and two pairs of substantially straight equalizer bars bearing on said journal boxes and located above said bolsters, whereby to render accessible for repairs and renewal brake shoes disposed between the wheels in the space spanned by the equalizer bar, substantially as described.

6. A railway car truck, comprising a truck frame having a vertically offset portion, a journal-box, a pedestal having a portion located beneath the truck-frame and above the journal-box, an equalizer bar bearing on the journal box, spring means interposed between the offset portion of said frame and bar and providing clearance under load between the upper face of the journal-box and the lower face of such pedestal portion and frame, substantially as described.

7. A railway car-truck comprising a truck-frame having a vertically offset portion, a journal-box, a pedestal having a lateral flange underlying said frame, a substantially straight equalizer-bar bearing upon the journal box beneath the frame, and spring means interposed between the offset portion of the frame and bar and providing clearance under load between the upper face of the bar and the lower face of the pedestal and frame, substantially as described.

8. In a six-wheel car-truck, the combination of journal boxes, equalizer bars bearing on said boxes, a truck frame including wheel pieces, springs interposed between the equalizer bars and wheel pieces, and a pair of brake shoes for each of the six wheels, certain of the brake shoes disposed within the spaces spanned by the equalizer bars, substantially as described.

9. In a six-wheel car-truck, the combination of journal boxes, substantially straight equalizer bars bearing on said boxes, a truck frame including wheel pieces provided with recesses, springs interposed between the equalizer bars and wheel pieces and accommodated in part in said recesses, and a pair of brake shoes for each of the six wheels, certain of the brake shoes disposed within the spaces spanned by the equalizer bars, substantially as described.

10. In a truck construction, wheel carrying axles, journal boxes, a truck frame having wheel pieces lying wholly above the axles and journal boxes, brake heads coöperating with the wheels carried by said axles, and equalizing bars extending between adjacent journal boxes for yieldingly supporting the truck frame upon the journal boxes, said equalizing bars being disposed wholly above the brake heads.

11. In a truck construction, wheel carrying axles, journal boxes, a truck frame having wheel pieces lying wholly above the axles and journal boxes, brake heads coöperating with the wheels carried by said axles, springs, and rigid equalizing members extending between adjacent journal boxes and coöperating with said springs for yieldingly supporting the truck frame upon the journal boxes, said equalizing members being disposed wholly above the brake heads.

LARS J. BERG.

Witnesses:
LUTHER JOHNS,
GEORGE G. KLABERT.